（12）United States Patent
Iwamoto (10) Patent No.: US 10,399,583 B2
(45) Date of Patent: Sep. 3, 2019

(54) POSITION MEASUREMENT DEVICE AND POSITION MEASUREMENT METHOD (71) Applicant: MITSUBISHI ELECTRIC CORPORATION, Tokyo (JP)

(72) Inventor: Takashi Iwamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 15/302,270

(22) PCT Filed: Jan. 19, 2015

(86) PCT No.: PCT/JP2015/051208
§ 371 (c)(1),
(2) Date: Oct. 6, 2016

(87) PCT Pub. No.: WO2015/159563
PCT Pub. Date: Oct. 22, 2015

(65) Prior Publication Data
US 2017/0029002 A1 Feb. 2, 2017

(30) Foreign Application Priority Data
Apr. 18, 2014 (JP) .................. 2014-086338

(51) Int. Cl.
*B61L 25/02* (2006.01)
*G01C 21/28* (2006.01)
(Continued)

(52) U.S. Cl.
CPC ........... *B61L 25/025* (2013.01); *B61L 25/021* (2013.01); *G01C 21/28* (2013.01); *G01S 19/45* (2013.01);
(Continued)

(58) Field of Classification Search
CPC .. B61L 25/025; B61L 25/021; B61L 2205/04; B61L 2205/02; G01S 19/52; G01S 19/50; G01S 19/45; G01C 21/28
(Continued)

(56) References Cited
U.S. PATENT DOCUMENTS 5,862,511 A * 1/1999 Croyle ................ G01C 21/28
701/445
5,931,889 A 8/1999 Misra
(Continued)

FOREIGN PATENT DOCUMENTS

JP 6-59014 A 3/1994
JP 2003-294825 A 10/2003
(Continued)

OTHER PUBLICATIONS

Preliminary Examination report (translation to English) for PCT/JP2015/051208, dated Mar. 24, 2015 (Year: 2015).*
(Continued)

*Primary Examiner* — Frank J McGue
(74) *Attorney, Agent, or Firm* — Oblon, McClelland, Maier & Neustadt, L.L.P.

(57) ABSTRACT

A position and time calculator, based on a navigation satellite signal, calculates a position of a navigation satellite and a position and a time where an antenna receives the navigation satellite signal. An upper limit error determiner evaluates an upper limit of error caused in positioning a reception position of the antenna based on an amount obtained by multiplying a difference between the time calculated based on the navigation satellite signal and the time measured by a time measurer by a coefficient determined based on arrangement of navigation satellites, and information on the position on the track stored in a memory. A position determiner corrects the moved distance measured (Continued)

by the speed measurer based on the evaluation of the upper limit of error in positioning, and determines the position of the antenna.

16 Claims, 3 Drawing Sheets

(51) Int. Cl.
*G01S 19/45* (2010.01)
*G01S 19/50* (2010.01)
*G01S 19/52* (2010.01)

(52) U.S. Cl.
CPC .............. *G01S 19/50* (2013.01); *G01S 19/52* (2013.01); *B61L 2205/02* (2013.01); *B61L 2205/04* (2013.01)

(58) Field of Classification Search
USPC .................................................... 342/357.33
See application file for complete search history.

(56) References Cited

U.S. PATENT DOCUMENTS

| | | | |
|---|---|---|---|
| 2003/0054832 A1 | 3/2003 | Stein | |
| 2011/0102252 A1 | 5/2011 | Watanabe et al. | |
| 2011/0238307 A1* | 9/2011 | Psiaki | G01C 21/28 701/469 |
| 2013/0248658 A1 | 9/2013 | Takagi | |

FOREIGN PATENT DOCUMENTS

| | | |
|---|---|---|
| JP | 2009-42179 A | 2/2009 |
| JP | 2010-78546 A | 4/2010 |
| JP | 2011-95184 A | 5/2011 |
| JP | 2011-137708 A | 7/2011 |
| JP | 4786001 B1 | 10/2011 |
| JP | 2011-225188 A | 11/2011 |
| JP | 2013-244758 A | 12/2013 |
| WO | 03/025614 A2 | 3/2003 |
| WO | 2012/077184 A1 | 6/2012 |

OTHER PUBLICATIONS

International Search Report dated Mar. 24, 2015 in PCT/JP2015/051208 filed Jan. 19, 2015.

P. Misra, et al., "Global Positioning System", 2012, Ganga-Jamuna Press, p. 204.

"F. Space Curves", The Mathematical Society of Japan, Encyclopedic Dictionary of Mathematics, 101 Differential Geometry of Curves and Surfaces, 2007, pp. 285-286.

Sean Bednarz, et al., "Receiver Clock-Based Integrity Monitoring for GPS Precision Approaches", IEEE Transactions on Aerospace and Electronic Systems, Apr. 2006, vol. 42, No. 2, pp. 636-643.

Office Action dated Oct. 6, 2015 in Japanese Patent Application No. 2015-537476 (with partial English language translation).

* cited by examiner

POSITION MEASUREMENT DEVICE AND POSITION MEASUREMENT METHOD

TECHNICAL FIELD

The present disclosure relates to an apparatus and a method for measuring a position.

BACKGROUND ART

In order to control a moving object based on the position of the moving object that runs along a one-dimensional curve (hereinafter referred to as a track), for example, a train that runs on a railway track, a method of calculating, based on a speed of the moving object, a moved distance of the moving object along a track and calculating the position of the moving object has been used. For example, as a method for measuring a running position of the train, accumulating values as moved distances, each of which is obtained by multiplying the number of wheel rotations obtained from a tachometer generator by a wheel circumference. Then, with reference to position information of a track antenna provided to a train protection apparatus that is placed on the railway track, the position of the moving object on the track is calculated based on the accumulated moved distance.

With respect to this, measuring a position by use of Global Positioning System (GPS) has been a known technique. For example, Patent Literature 1 discloses a technique for simplifying the measurement of the position by calculating the position based on position information obtained from the GPS and speed information obtained from the tachometer generator. Patent Literature 1 determines, as a current train position, the position obtained by adding, to the position of an own train found based on a GPS signal, a correction value calculated based on a status of the own train, when a reception status value is equal to or greater than a threshold value which is used for determining accuracy of the position of the own train found based on the GPS signal, or alternatively, determines, as the current position of the train, the position obtained by adding the correction value to the position obtained by adding the moved distance to a reference position, when the reception status value is less than the threshold value.

Also, Patent Literature 2 discloses a method of excluding an erroneous positioning result under assumption that a radio wave that causes an error is transmitted from at best no more than one satellite.

CITATION LIST

Patent Literature 1: Japanese Patent No. 4786001
Patent Literature 2: U.S. Pat. No. 5,931,889

SUMMARY OF INVENTION

Technical Problem

According to a position measurement method as disclosed in Patent Literature 1, even if the GPS signals includes a signal that causes the error, the user might be unable to detect the error if a reception level of the signal is equal to or greater than the threshold value. This might cause the user to determine the current position of the train based on the erroneous positioning result. Also, according to a position measurement method as disclosed in Patent Literature 2, there is no measure to check, from a receiver, whether the assumption, that the radio wave that causes the error is transmitted from at best no more than one satellite, is valid or invalid. If the assumption is invalid, the user might determine the position based on the erroneous positioning result.

If the above problems are applied to systems and the like for controlling the train based on, for example, the position of the train, problems such as conducting erroneous controls will arise. Especially, when a stopping position of the train is set, the train might pass beyond the stopping position without noticing the error included in the measured position.

The present disclosure has been made to solve the above mentioned problems, and an objective of the present disclosure is to measure a position of an antenna that receives the radio wave transmitted from the navigation satellite and to then grasp an upper limit of the error included in the positioning result.

Solution to Problem

To achieve the above objectives, a position measurement apparatus according to the present disclosure that measures a position of an antenna that moves along a determined track and receives a radio wave transmitted from a navigation satellite comprises: a radio wave receiver, a memory, a speed measurer, a position and time calculator, a time measurer, an upper limit error determiner, and a position determiner. The radio wave receiver receives, via the antenna, the radio wave transmitted from the navigation satellite and receives a navigation satellite signal. The memory stores the position on the track relative to an earth. The speed measurer measures the moving speed of the antenna and measures the moved distance along the track of the antenna from the reference position on the track. The position and time calculator, based on the navigation satellite signal received by the radio wave receiver, calculates the position of the navigation satellite and the position and the time where the antenna receives the navigation satellite signal. The time measurer, separately from the position and time calculator, measures a time under a condition where a certain error is allowed. The upper limit error determiner evaluates the upper limit of the error caused in positioning a reception position of the antenna based on an amount obtained by multiplying (i) a difference between the time calculated by the position and time calculator and the time measured with the time measurer by (ii) a coefficient determined based on the arrangement of the navigation satellites, and the information on the position on the track. The upper limit error determiner determines whether the upper limit of error caused in positioning is allowable. The position determiner corrects a moved distance measured with the speed measurer based on the determination result by the upper limit error determiner, and determines the position of the antenna.

Advantageous Effects of Invention

The present disclosure includes an upper limit error determiner that evaluates an upper limit of an error by use of the upper limit of error inequality. This enables the present disclosure to measure a position of an antenna that receives a radio wave transmitted from a navigation satellite and to then grasp the upper limit of the error included in the positioning result, even if the assumption, that the radio wave that causes the error is transmitted from at best no more than one satellite, is invalid.

DESCRIPTION OF EMBODIMENTS

Embodiment 1

Figure 1:
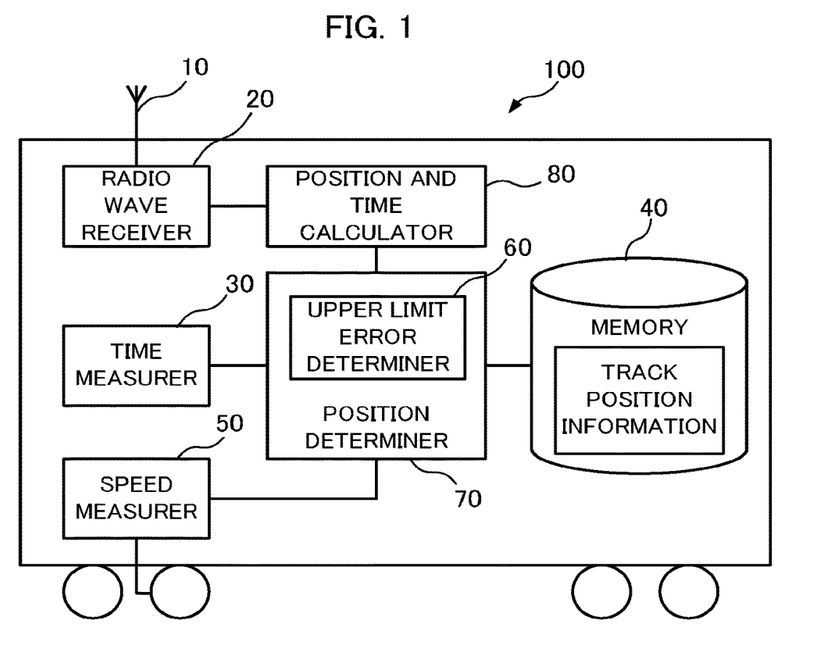
FIG. 1 is a block diagram illustrating a configuration example of a position measurement apparatus according to embodiments of the present disclosure.

FIG. 1 is a block diagram illustrating a configuration example of a position measurement apparatus according to the embodiments of the present disclosure. A position measurement apparatus 100 includes an antenna 10, a radio wave receiver 20, a time measurer 30, a memory 40, a speed measurer 50, an upper limit error determiner 60, a position determiner 70, and a position and time calculator 80. The position measurement apparatus 100 is provided on the moving object that moves along a determined track, for example, provided on a railway vehicle or a monorail vehicle. The antenna 10 is affixed to the moving object, and thus moves along the determined track. The antenna 10 receives the radio wave transmitted by the navigation satellite (not illustrated) and converts the radio wave to an amplified voltage signal.

The radio wave receiver 20 receives, via the antenna 10, the radio wave transmitted by the navigation satellite to receive the navigation satellite signal. The radio wave receiver 20, for example, eliminates the carrier wave component from the voltage signal outputted from the antenna 10 to obtain a baseband signal, and applies a digital conversion to the baseband signal to generate the navigation satellite signal.

The time measurer 30 measures the time within a preset error range by use of an atomic clock or a crystal oscillator. Alternatively, the time measurer 30 may measure attributes in advance and correct the time to reduce the error range. Alternatively, the time measurer 30 may periodically receive time information transmitted from a transmitting station to automatically correct the times. The transmitting station is directed to transmit standard radio waves.

The memory 40 includes a logic circuit and the like having a nonvolatile memory element, stores in advance the position (coordinates) on the track relative to the earth, the antenna 10 moving on the track, and outputs the position information as necessary. The position on the track is expressed by longitude, latitude, and altitude. For example, the memory 40 stores coordinates of the points that divide the track and may approximate space between the points with a straight line. Alternatively, a section of the track may be expressed via functions by use of polar coordinates of the earth or a coordinate system fixed on the Earth's surface.

The speed measurer 50 measures the moving speed of the antenna 10 by use of, for example, a tachometer generator and measures the moved distance along the track by adding the moving speed. Further, as another means, the speed measurer 50 may measure the moving speed of the antenna 10 by adding acceleration outputted from an inertial navigation system and measure the moving distance along the track by adding the moving speed.

The position and time calculator 80 calculates, based on the navigation satellite signal received by the radio wave receiver 20, the position of the navigation satellite and the position and the time where the antenna 10 receives the navigation satellite signal.

The upper limit error determiner 60 evaluates the upper limit of error caused in measuring the reception position of the antenna 10 based on the information on the position on the track and the amount obtained by multiplying (i) the difference between the time calculated by the position and time calculator 80 and the time measured with the time measurer 30 by (ii) the coefficient determined based on the arrangement of the navigation satellites from which the radio wave receiver 20 receives the navigation satellite signals. Then, the upper limit error determiner 60 determines whether the upper limit of error caused in positioning is allowable.

The position determiner 70 corrects the moved distance measured with the speed measurer 50 based on the determination result by the upper limit error determiner 60 to determine the position of the antenna 10. Operations of the upper limit error determiner 60 and the position determiner 70 are explained below in detail.

Based on the signal received at a reference point $x_0$ at time $t_0$, a pseudo range $\rho_j$ from the satellite j (=1, 2, . . . ) is linearized at a neighborhood thereof $(x_0+\delta x, t_0+\delta b/c) \varepsilon R^4$ (providing that c is the speed of light, $R^4$ is real 4-space, and ($\delta x$, $\delta b$) is the orthogonal coordinates of the neighborhood). Accordingly, an observation equation of a pseudo range displacement $\delta \rho_j$ (P. Misra, et al., "Global Positioning System," equations 6.9 and 6.10, page 204, Ganga-Jamuna Press, 2012.) is obtained.

$$\delta \rho_j = g_j \delta x + \delta b + \varepsilon_j$$

A geometric vector $g_j=(g_{j,1}, g_{j,2}, g_{j,3})$ is obtained by multiplying, by −1, a directional vector of the satellite j as viewed from the reference point $x_0$. The notation $g_j \delta x$ represents a product of (i) a matrix of one row and three columns (a row vector) $g_j$ and (ii) a matrix of three rows and one column (a column vector) $\delta x$. The $\varepsilon_j$ represents the error superimposed to the signal which is from the satellite j.

It is assumed that the reception position P is positioned on the track expressed by mostly differentiable and known continuous functions $x(s)=(X(s), Y(s), Z(s))^T$ which is relative to the distance s from the reference point. In other words, it is assumed that the coordinates of each point on the distances along the track from the reference point of the track are expressed by continuous functions x(s). The superscript suffix T on the right side of the above equation represents transposition.

Figure 2:
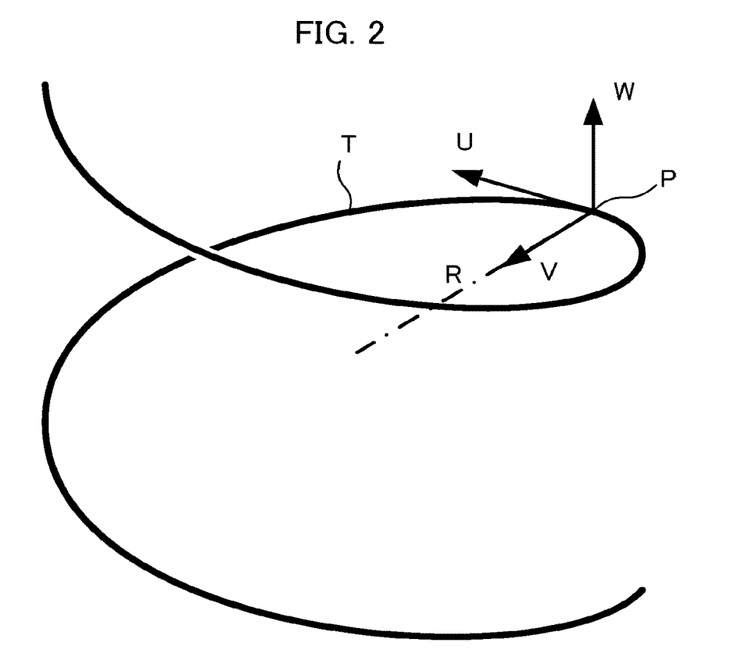
FIG. 2 is a diagram illustrating orthogonal coordinates along a track on which an antenna of the position measurement apparatus according to embodiments is moving.

FIG. 2 is a diagram illustrating orthogonal coordinates along a track on which the antenna of the position measurement apparatus according to embodiments is moving. With respect to a point P (the reception position) on the track T, a unit vector in a tangential direction is expressed as U, a curvature radius thereof is expressed as R, and the unit vector (principal normal) in a contact circle radius direction is expressed as V. Additionally, the unit vector (binormal) orthogonal to the tangential direction and the contact circle radius direction is expressed as W. A basis vector of real 3-space includes the vectors U, V, and W. Length $\delta x$ of a short section including any point P on the track is expressed as $\delta x = \delta u U + \delta v V + \delta w W$.

A curve in the neighborhood of the reference point $x_0$ is approximated with an osculating circle (Edited by The Mathematical Society of Japan, Encyclopedic Dictionary of Mathematics, 101 Differential Geometry of Curves and Surfaces, page 286 "F. Space Curves", Iwanami Shoten, Publishers, 2007). Accordingly, the following equation is obtained.

$$(u(s), v(s)) = (R \sin(s/R), R(1 - \cos(s/R))) \qquad 5$$

The notations sin θ and cos θ respectively represent sine functions and cosine functions of a real number θ.

Under the approximation, projection, to distance coordinates s, from the positioning coordinates (u, v) which are linearized relative to the distance to the satellite is represented with inverse mapping of osculating circle approximation if a domain is taken as v<R:

$$s = R \arctan(Ru/(R-v))$$

Here, the notation arctan x represents arc tangent functions of the real number x. Accordingly, the following is obtained at the neighborhood of the reference point:

$$\delta s = \frac{R(r-v)(u^2 + (R-v)^2)}{(R-v)^4} \delta u + \frac{Ru(u^2 + (R-v)^2)}{(R-v)^4} \delta v \qquad \text{[Equation 1]}$$

This evaluation is also valid for the position of the antenna 10 affixed to, for example, the train which moves on the known track or a monorail or the like which moves by being suspended from the known track.

Effects of a tangential direction error δu and a contact circle radius direction error δv on the track error δs change depending on the curvature radius R. Thus, it is necessary to respectively evaluate R and v according to objects. If the GPS signals are received from three satellites j=1, 2, 3, the following observation equation is obtained by use of direction cosines $f_j := g_j \cdot U$.

$$\begin{pmatrix} \delta\rho_1 \\ \delta\rho_2 \\ \delta\rho_3 \end{pmatrix} = \begin{pmatrix} f_1 & h_1 & 1 \\ f_2 & h_2 & 1 \\ f_3 & h_3 & 1 \end{pmatrix} \begin{pmatrix} \delta u \\ \delta v \\ \delta b \end{pmatrix} + \begin{pmatrix} \varepsilon_1 \\ \varepsilon_2 \\ \varepsilon_3 \end{pmatrix} \qquad \text{[Equation 2]}$$

The notation A·B represents an inner product of vectors A and B. Relative to the arrangement of the satellites that satisfies the following condition, $$D := f_1 h_2 - f_2 h_1 + f_2 h_3 - f_3 h_2 + f_3 h_1 - f_1 h_3 \neq 0$$

if Equation 2 is modified, the following equation is obtained.

$$\begin{pmatrix} \delta u \\ \delta v \\ \delta b \end{pmatrix} = \qquad \text{[Equation 3]}$$

$$\frac{1}{D} \begin{pmatrix} h_2 - h_3 & h_3 - h_1 & h_1 - h_2 \\ f_3 - f_2 & f_1 - f_3 & f_1 - f_2 \\ f_2 h_3 - f_3 h_2 & f_3 h_1 - f_1 h_3 & f_1 h_2 - f_2 h_1 \end{pmatrix} \begin{pmatrix} \delta\rho_1 - \varepsilon_1 \\ \delta\rho_2 - \varepsilon_2 \\ \delta\rho_3 - \varepsilon_3 \end{pmatrix}$$

If the correct error $\varepsilon_j$ is substituted with the right side of the equation 3, the equation 3 outputs the amount of change in coordinates (δu, δv, δb) relative to the amount of change in the pseudo range $\delta\rho_j$. Alternatively, if the error is not correctly substituted, the output value includes the positioning error. Augmentation information is provided to the target satellite clock error and the track error. Accordingly it is statistically confirmed that the error between the clock and the track is small. Assuming use of the target satellite clock error and the track error, a larger scale of error is discussed. The remaining errors are largely affected by physical delay such as ionospheric delay, tropospheric delay, and multipath. This leads to $\varepsilon_j$>0. When any of the ionospheric delay, the tropospheric delay, and the multipath is not substituted, the error $r_j := \delta\rho_j - \varepsilon_j > 0$ is remained in observables at the reference point. This causes the positioning error.

Relative to complex number $z_j := f_j + ih_j$, the equation $z_4 = z_1$ is set. j is equal to any of 1, 2, and 3, and i is an imaginary unit. The notations Im(z) and z* respectively represent an imaginary component of the complex number z and a complex conjugate of the complex number z. Relative to j=1, 2, 3, the equation $\text{Im}(z_j^* z_{j+1}) = f_j h_{j+1} - f_{j+1} h_j$ applies. However, by appropriately changing the order of numbers j=1, 2, 3, with the complex number of $\text{Im}(z_j^* z_{j+1}) > 0$, pairs that satisfy $\text{Im}(z_1^* z_1 z_2^* z_2 z_3 \ z_3) = 0$ are present. With the arrangement of the satellites that satisfy the condition, the following equation holds:

$$|\delta u| = \left| \frac{(h_2 - h_3)r_1 + (h_3 - h_1)r_2 + (h_1 - h_2)r_3}{D} \right| \leq \qquad \text{[Equation 4]}$$

$$\frac{\max(|h_2 - h_3|, |h_3 - h_1|, |h_1 - h_2|)(r_1 + r_2 + r_3)}{|D|} \leq$$

$$\frac{\max(|h_2 - h_3|, |h_3 - h_1|, |h_1 - h_2|) \begin{pmatrix} |f_2 h_3 - f_3 h_2|r_1 + \\ |f_3 h_1 - f_1 h_3|r_2 + |f_1 h_2 - f_2 h_1|r_3 \end{pmatrix}}{|D| \min(|f_2 h_3 - f_3 h_2|, |f_3 h_1 - f_1 h_3|, |f_1 h_2 - f_2 h_1|)} |\delta b|$$

$$= \frac{\max(|h_2 - h_3|, |h_3 - h_1|, |h_1 - h_2|)}{\min(|f_2 h_3 - f_3 h_2|, |f_3 h_1 - f_1 h_3|, |f_1 h_2 - f_2 h_1|)} |\delta b|$$

The notations min (a, b, c) and max (a, b, c) respectively represent a minimum value and a maximum value of the real numbers a, b, c. The similar equation holds for |δv| as well.

A tangential direction magnification coefficient $M_u$ and a contact circle radius direction magnification coefficient $M_v$ are as defined below.

$$M_u := \frac{\max(|h_2 - h_3|, |h_3 - h_1|, |h_1 - h_2|)}{\min(|f_2 h_3 - f_3 h_2|, |f_3 h_1 - f_1 h_3|, |f_1 h_2 - f_2 h_1|)} \qquad \text{[Equation 5]}$$

$$M_v := \frac{\max(|f_2 - f_3|, |f_3 - f_1|, |f_1 - f_2|)}{\min(|f_2 h_3 - f_3 h_2|, |f_3 h_1 - f_1 h_3|, |f_1 h_2 - f_2 h_1|)}$$

With the coefficients, inequality of upper limit of error in tangential direction $|\delta u| \leq M_u |\delta b|$ and inequality of upper limit of error in contact circle radius direction $|\delta v| \leq M_v |\delta b|$ respectively hold.

From the above processes, using the tangential direction magnification coefficient $M_u$ and the contact circle radius direction magnification coefficient $M_v$, which are determined based on the arrangement of the satellites, the upper limit of an error on track |δs| is obtained from (i) the measured clock bias error |δb| and the upper limit of error in tangential direction obtained from the inequality of upper limit of error in tangential direction and (ii) the measured clock bias error |δb| and an upper limit of error in contact circle radius direction obtained from the inequality of upper limit of error in contact circle radius direction. The upper limit error determiner 60 determines whether the upper limit of the error on track |δs| is within a given range. If the upper limit of the error on track |δs| is within the given range, the position determiner 70 corrects the moved distance obtained from the speed measurer 50 using the positioning result obtained by use of the pseudo range measured from the satellite.

Figure 3:
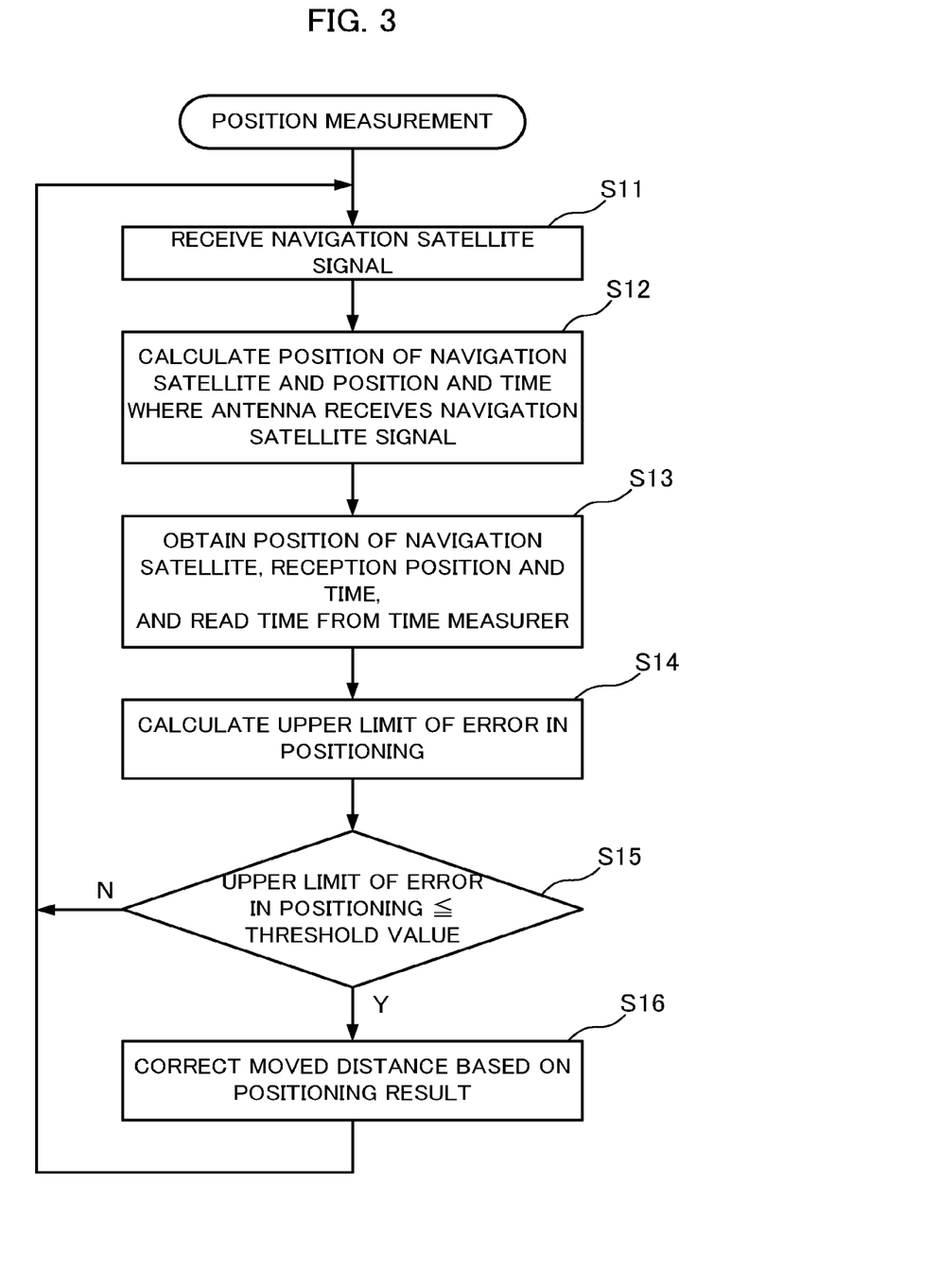
FIG. 3 is a flowchart illustrating an example of operations for measuring a position according to Embodiment 1.

FIG. 3 is a flowchart illustrating an example of operations for measuring a position according to Embodiment 1 The time measurer 30, separately from the position and time calculator 80, always measures the time under a condition where a certain error is allowed. Further, the speed measurer 50 always measures the moving speed of the antenna 10 (the moving object) to measure the moved distance along the track of the antenna 10 from the reference position on the track.

The radio wave receiver 20 receives the radio wave transmitted by the navigation satellite with the antenna 10 and receives the navigation satellite signal (step S11). The position and time calculator 80 calculates, based on the navigation satellite signal, the position of the navigation satellite and the position and the time where the antenna 10 receives the navigation satellite signal (step S12).

The upper limit error determiner 60 obtains, from the position and time calculator 80, the position of the navigation satellite and the position and the time where the antenna 10 receives the navigation satellite signal, and reads the time from the time measurer 30 (step S13). Based on the above mentioned method, an upper limit of error in positioning is calculated (step S14).

If the upper limit of error in positioning is equal to or less than a threshold value (step S15; Y), the position determiner 70 corrects, based on the positioning result, the moved distance measured with the speed measurer 50 (step S16). Alternatively, if the upper limit of error in positioning is greater than the threshold value (step S15; N), the position determiner 70 does not correct the moved distance. Then the processing returns to step S11 to repeat the procedure of receiving a positioning signal.

The position measurement apparatus of Embodiment 1 includes the upper limit error determiner 60 that evaluates the upper limit of the error by use of the upper limit of error inequality. This enables the position measurement apparatus to correctly determine the upper limit of the error, even if the assumption that, the radio wave that causes the error is transmitted by at best no more than one satellite, is invalid. For example, conditions of selecting three satellites which are placed at preferable positions are provided to the antenna 10 which is known to be positioned on the one-dimensional curve, such as the antenna 10 affixed to the train. This enables the position measurement apparatus to evaluate the upper limit of the error in positioning based on time information obtained from positioning which uses the radio waves transmitted from the satellites that satisfy the conditions of the preferable positions. The above configuration enables the positioning result and the upper limit of the error thereof to be known, even if the number of visible satellites is small.

Application of the above described technique is not limited to the position of the train, but the above described technique is also applicable in measuring the position of an antenna that moves along a known one-dimensional curve which can be determined as the set track. Examples of such position measurement also include vehicles that move along vehicle lanes, ships that move along narrow channels, and the like.

Embodiment 2

In a section where the curvature radius R of the curve is sufficiently long, the contact circle radius direction error δv does not affect the error on track |δs|. This case introduces a virtual third satellite j=3 that outputs a signal for cancelling only the contact circle radius direction error δv. By use of two real satellites j=1, 2, the upper limit of the error and the position are determined. However, the observation equation is as follows at the limit of $|h_3| \to \infty$.

$$\begin{pmatrix} \delta\rho_1 \\ \delta\rho_2 \\ \delta\rho_3 \end{pmatrix} = \begin{pmatrix} f_1 & h_2 & 1 \\ f_2 & h_2 & 1 \\ 0 & h_3 & 0 \end{pmatrix} \begin{pmatrix} \delta u \\ \delta v \\ \delta b \end{pmatrix} + \begin{pmatrix} \varepsilon_1 \\ \varepsilon_2 \\ \varepsilon_3 \end{pmatrix} \quad [\text{Equation 6}]$$

At this time, an existence condition of an inverse matrix is $D'=f_2-f_1 \neq 0$, and relative to the arrangement of the satellites that satisfies the condition, the following equation is obtained $$\begin{pmatrix} \delta u \\ \delta v \\ \delta b \end{pmatrix} = \frac{1}{D'} \begin{pmatrix} -1 & 1 & (h_1-h_2)/h_3 \\ 0 & 0 & (f_2-f_1)/h_3 \\ f_2 & -f_1 & (f_1 h_2 - f_2 h_1)/h_3 \end{pmatrix} \begin{pmatrix} \delta\rho_1 - \varepsilon_1 \\ \delta\rho_2 - \varepsilon_2 \\ \delta\rho_3 - \varepsilon_3 \end{pmatrix} \quad [\text{Equation 7}]$$

Exactly the same as described in Embodiment 1, by appropriately changing the order of the numbers, when $f_1>0$ and $f_2<0$, the tangential direction magnification coefficient is defined as follows.

$$M_u := 1/\min(|f_1|,|f_2|)$$

Then, the inequality of upper limit of error in tangential direction $|\delta u| \leq M_u |\delta b|$ is obtained. The upper limit error determiner 60 determines whether the upper limit of the error on track $|\delta s| \approx |\delta u|$ is within the given range. If the upper limit of the error on track is within the given range, the position determiner 70 corrects the moved distance obtained from the speed measurer 50 based on the positioning result obtained by use of the pseudo range measured from the satellite.

Patent Literature 2 discloses a receiver including a stable clock and discloses a technique of receiving the positioning result only when the difference between the time obtained from the clock and time information obtained by positioning is within a certain range (page 8, column 3, lines 48 to 57). However, there are cases where no error is found in the time information obtained by positioning and the positioning error becomes large without limit. For example, it is assumed that the navigation satellites are respectively viewed at a 45 degree elevation angle in a south direction and at a 60 degree elevation angle in a south direction; direct waves from the navigation satellites are hidden; and it is assumed that by the reflection of the direct waves, radio waves having optical path length of $\sqrt{2}\cdot Lm$ and $Lm$ ($L>0$) are received; whereas the direct waves are not received. Further, it is assumed that no other error causes are found and a total of two or more satellites (of any elevation angle)

are found in an east direction and in a west direction. At this time, the positioning result does not cause the error to the time, and the position includes the error of 2Lm in a north direction. If the above described arrangement of the satellites is employed, the technique disclosed in Patent Literature 2 includes the possibility of receiving the erroneous positioning result.

If service of providing error augmentation information which is to be superimposed to the navigation satellite signal is available, residuals can be improved by use of the service.

The upper limit of error inequality is directed to express that the upper limit of an absolute value of positioning error is equal to or less than a value obtained by multiplying a magnification coefficient by a clock deviation absolute value. However, upper limit of error inequality is not limited to the above and can be expressed another way. The upper limit of error inequality can easily calculate the upper limit by use of a general central processing unit (CPU), a large scale integrated circuit, or a programmable logic circuit or the like. Further, the upper limit error determiner 60 and the position determiner 70 may include a general processor and general software or a logic circuit or a Field Programmable Gate Array (FPGA) or the like.

According to the position measurement apparatus of Embodiment 2, when a curvature of the track on which the antenna is positioned is small, the antenna is provided with the condition of selecting two satellites which are placed at the preferable positions. Accordingly, the position measurement apparatus can evaluate the upper limit of error in positioning based on the time information obtained from positioning which uses the radio wave transmitted by the two satellites that satisfy the condition of preferable positions.

Embodiment 3

For example, when the stopping position of the train is set on the track, the train protection apparatus (not illustrated) mounted on the train needs to be controlled to prevent the train from passing beyond the stopping position. The upper limit error determiner 60 and the position determiner 70 obtain a position P of the antenna 10 and an upper limit K of the error on track |δs| based on (i) the navigation satellite signal outputted by the radio wave receiver 20, (ii) the track position information stored in the memory 40, and (iii) the time outputted from the time measurer 30, by employing either one of the above described Embodiment 1 or Embodiment 2. Further, the position determiner 70 adds the upper limit of error in positioning to the reception position of the antenna 10 in the forward moving direction of the antenna 10 on the track to determine a position of the antenna 10. The position measurement apparatus 100 outputs, to the train protection apparatus (not illustrated), the determined position of the antenna 10. The train protection apparatus can detect a front position of the train based on the position of the antenna 10 because the antenna 10 is affixed to the train.

The determined front position of the train is sometimes further ahead in the moving direction than an actual front position, but at least the actual front position cannot be further ahead in the moving direction than the calculated position. This prevents the train from passing beyond the stopping position and enables the train to surely stop at the stopping position or before arriving at the stopping position. The use of a quantitative upper limit of the error enables quantitative control without the ambiguity caused by the comparing of the reception status value with the threshold value as in the method disclosed in Patent Literature 1 which is described above in the Background Art section.

Figure 4:
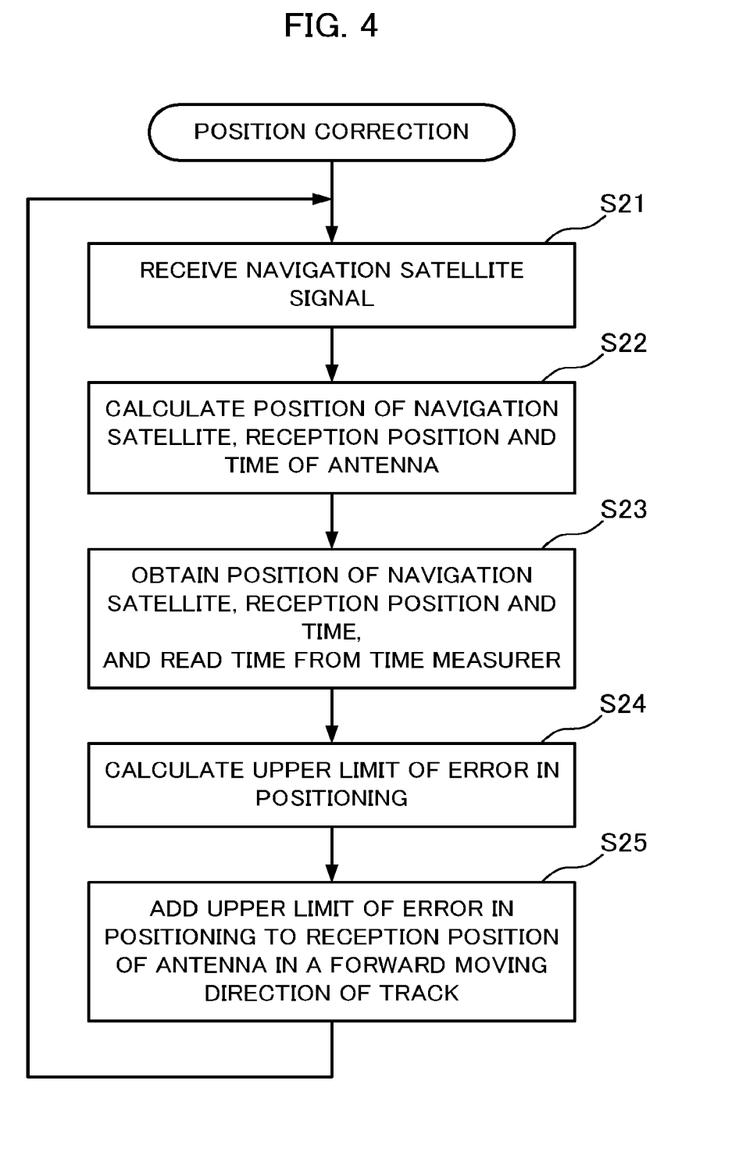
FIG. 4 is a flowchart illustrating an example of operations for position correction according to Embodiment 3 of the present disclosure.

FIG. 4 is a flowchart illustrating an example of operations for position correction according to Embodiment 3 of the present disclosure. Steps S21 to S24 in FIG. 4 are the same as steps S11 to S14 in FIG. 3. In Embodiment 3, after the upper limit of error in positioning is calculated (step S24), the position determiner 70 adds the upper limit of error in positioning to the reception position of the antenna 10 in the forward moving direction of the antenna 10 on the track to determine a position of the antenna (step S25). Then, a processing returns to step S21 to repeat the procedure of receiving the navigation satellite signal.

As described above, in the present embodiment, the position determiner 70 obtains the front position of the train by adding in the forward moving direction of the train, (i) the upper limit of the error obtained based on the output of the radio wave receiver 20, the output of the memory 40, and the output of the time measurer 30 to (ii) an antenna position obtained from the speed measurer 50 based on the output of the radio wave receiver 20. This enables the train protection apparatus to, regardless of a reception status of the GPS signal, determine the front position of the train as a position which is not further behind the front position of an actual train and surely stop the train before arriving at a stop limit. By employing the configuration, even if the error is superimposed to an estimated position, the upper limit of the error which is greater than the error is added. Accordingly, the ambiguity caused by comparing the reception status value with the threshold value to correct the error is excluded and thus the train can be surely stopped at the stopping position or before arriving at the stopping position based on the quantitative upper limit of the error.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2014-86338 filed on Apr. 18, 2014, the entire disclosure of which is incorporated by reference herein.

REFERENCE SIGNS LIST

10 Antenna
20 Radio wave receiver
30 Time measurer
40 Memory
50 Speed measurer
60 Upper limit error determiner
70 Position determiner
80 Position and time calculator
100 Position measurement apparatus

The invention claimed is:

1. A position measurement method conducted by a position measurement apparatus for measuring a position of an antenna that moves along a determined track and receives a radio wave transmitted by a navigation satellite, the position measurement method including receiving, with the antenna, the radio wave transmitted by the navigation satellite to receive a navigation satellite signal, measuring a moving speed of the antenna and measuring a moved distance of the antenna along the track, correcting the moved distance measured based on a measurement result from the navigation satellite signal and determining the position of the antenna, the position measurement method comprising:

calculating, based on the navigation satellite signal received, a position of the navigation satellite and a position and a time where the antenna receives the navigation satellite signal;

measuring, separately from the calculating, a time under a condition where a certain error is allowed; and     (i) obtaining an upper limit of error caused in positioning a reception position of the antenna based on an amount obtained by multiplying a coefficient determined based on arrangement of the navigation satellites by a time difference between the time calculated and the time measured which is for, separately from the calculating, measuring the time under the condition where the certain error is allowed, and information on the position on the track that is stored in the position measurement apparatus and (ii) determining whether the upper limit of error in positioning is within a given range,     wherein when the determination is not within the given range, the position of the antenna is determined without correcting the moved distance measured.

2. The position measurement method according to claim 1, wherein when the upper limit of error is determined, a magnification coefficient is obtained, the magnification coefficient being a ratio of the clock bias error of the upper limit of error in positioning by calculating with use of an element of a reverse matrix of a matrix defined by an observation equation of a pseudo range displacement in accordance with an antenna position and a clock bias, and then the upper limit of error caused in positioning a reception position of the antenna by projecting to a distance coordinates direction of the track the upper limit of error obtained by multiplying the time error by the magnification coefficient is obtained.

3. The position measurement method according to claim 2, wherein when the radio wave is received, navigation satellite signals from three navigation satellites are simultaneously received;

when calculation is conducted, the reception position of the antenna is calculated based on the navigation satellite signals received from the three navigation satellites; and     when the upper limit of error is determined, the upper limit of error in positioning is obtained based on a positioning error in a tangential direction relative to the track and a positioning error in a contact circle radius direction relative to the track.

4. The position measurement method according to claim 2, wherein when the radio wave is received, navigation satellite signals from two navigation satellites are simultaneously received;

when the calculation is conducted, the reception position of the antenna is calculated based on the navigation satellite signals simultaneously received from the two navigation satellites in a section larger than a value determined based on a curvature radius of the track; and     when the upper limit of error is determined, the upper limit of error in positioning is obtained based on the positioning error in the tangential direction relative to the track in the section larger than the value determined based on the curvature radius of the track.

5. A position measurement method conducted by a position measurement apparatus for measuring a position of an antenna that moves along a determined track and receives a radio wave transmitted by a navigation satellite, the position measurement method comprising:

receiving, with the antenna, the radio wave transmitted by the navigation satellite and receiving a navigation satellite signal;

calculating, based on the navigation satellite signal received, a position of the navigation satellite and a position and a time where the antenna receives the navigation satellite signal;

measuring, separately from the calculating, a time under a condition where a certain error is allowed;

obtaining an upper limit of error caused in positioning a reception position of the antenna based on an amount obtained by multiplying a coefficient determined based on arrangement of the navigation satellites by a time difference between the time calculated and the time measured which is for, separately from the calculating, measuring the time under the condition where the certain error is allowed, and information on the position on the track relative to the Earth that is stored in the position measurement apparatus; and     adding the upper limit of error in positioning to the reception position of the antenna in a forward moving direction of the antenna on the track to determine the position of the antenna.

6. The position measurement method according to claim 5, wherein when the upper limit of error is determined, a magnification coefficient is obtained, the magnification coefficient being a ratio of the clock bias error of the upper limit of error in positioning by calculating with use of an element of a reverse matrix of a matrix defined by an observation equation of a pseudo range displacement in accordance with an antenna position and a clock bias, and then the upper limit of error caused in positioning a reception position of the antenna by projecting to a distance coordinates direction of the track the upper limit of error obtained by multiplying the time error by the magnification coefficient is obtained.

7. The position measurement method according to claim 6, wherein when the radio wave is received, navigation satellite signals from three navigation satellites are simultaneously received;

when the calculation is conducted, the reception position of the antenna is calculated based on the navigation satellite signals received from the three navigation satellites; and     when the upper limit of error is determined, the upper limit of error in positioning is obtained based on a positioning error in a tangential direction relative to the track and a positioning error in a contact circle radius direction relative to the track.

8. The position measurement method according to claim 6, wherein when the radio wave is received, navigation satellite signals from two navigation satellites are simultaneously received;

when the calculation is conducted, the reception position of the antenna is calculated based on the navigation satellite signals simultaneously received from the two navigation satellites in a section larger than a value determined based on a curvature radius of the track; and when the upper limit of error is determined, the upper limit of error in positioning is obtained based on the positioning error in the tangential direction relative to the track in the section larger than the value determined based on the curvature radius of the track.

9. A position measurement apparatus that measures a position of an antenna that moves along a determined track and receives a radio wave transmitted by a navigation satellite, the position measurement apparatus comprising:
   a radio wave receiver to receive, via the antenna, the radio wave transmitted by the navigation satellite to receive a navigation satellite signal;
   a memory to store a position of the track relative to the Earth;
   a position and time calculator to, based on the navigation satellite signal received by the radio wave receiver, calculate a position of the navigation satellite and a position and a time where the antenna receives the navigation satellite signal;
   a time measurer to, separately from the position and time calculator, measure a time under a condition where a certain error is allowed;
   an upper limit error determiner to obtain an upper limit of error caused in positioning a reception position of the antenna based on an amount obtained by multiplying a time difference between the time calculated by the position and time calculator and the time measured by the time measurer by a coefficient determined based on arrangement of the navigation satellites, and information on the position on the track; and
   a position determiner to add the upper limit of error in positioning to the reception position of the antenna in a forward moving direction of the antenna on the track to determine the position of the antenna.

10. The position measurement apparatus according to claim 9, wherein
    the upper limit error determiner obtains a magnification coefficient, the magnification coefficient being a ratio of the clock bias error of the upper limit of error in positioning by calculating with use of an element of a reverse matrix of a matrix defined by an observation equation of a pseudo range displacement in accordance with an antenna position and a clock bias, and then obtains the upper limit of error caused in positioning a reception position of the antenna by projecting to a distance coordinates direction of the track the upper limit of error obtained by multiplying the time error by the magnification coefficient.

11. The position measurement apparatus according to claim 9, wherein
    the radio wave receiver simultaneously receives navigation satellite signals from three navigation satellites;
    the position and time calculator calculates the reception position of the antenna based on the navigation satellite signals received from the three navigation satellites; and
    the upper limit error determiner obtains the upper limit of error in positioning based on a positioning error in a tangential direction relative to the track and a positioning error in a contact circle radius direction relative to the track.

12. The position measurement apparatus according to claim 10, wherein
    the radio wave receiver simultaneously receives navigation satellite signals from three navigation satellites;
    the position and time calculator calculates the reception position of the antenna based on the navigation satellite signals received from the three navigation satellites; and
    the upper limit error determiner obtains the upper limit of error in positioning based on a positioning error in a tangential direction relative to the track and a positioning error in a contact circle radius direction relative to the track.

13. The position measurement apparatus according to claim 9, wherein
    the radio wave receiver simultaneously receives navigation satellite signals from two navigation satellites;
    the position and time calculator, in a section larger than a value determined based on a curvature radius of the track, calculates the reception position of the antenna based on the navigation satellite signals simultaneously received from the two navigation satellites; and
    the upper limit error determiner, in the section larger than the value determined based on the curvature radius of the track, obtains the upper limit of error in positioning based on the positioning error in the tangential direction relative to the track.

14. The position measurement apparatus according to claim 10, wherein
    the radio wave receiver simultaneously receives navigation satellite signals from two navigation satellites;
    the position and time calculator, in a section larger than a value determined based on a curvature radius of the track, calculates the reception position of the antenna based on the navigation satellite signals simultaneously received from the two navigation satellites; and
    the upper limit error determiner, in the section larger than the value determined based on the curvature radius of the track, obtains the upper limit of error in positioning based on the positioning error in the tangential direction relative to the track.

15. The position measurement apparatus according to claim 9, further comprising:
    a speed measurer to measure a moving speed of the antenna and measure a moved distance of the antenna along the track from a reference position of the track, wherein
    the upper limit error determiner determines whether the upper limit error in positioning is within a given range, and
    the position determiner determines, when the determination by the upper limit error determiner is not within the given range, the position of the antenna from the moved distance measured by the speed measurer.

16. The position measurement apparatus according to claim 10, further comprising:
    a speed measurer to measure a moving speed of the antenna and measure a moved distance of the antenna along the track from a reference position of the track, wherein
    the upper limit error determiner determines whether the upper limit error in positioning is within a given range, and
    the position determiner determines, when the determination by the upper limit error determiner is not within the given range, the position of the antenna from the moved distance measured by the speed measurer.

* * * * *